United States Patent [19]

Baeg

[11] Patent Number: 5,323,483
[45] Date of Patent: Jun. 21, 1994

[54] APPARATUS AND METHOD FOR CONTROLLING SPEED OF SUCTION MOTOR IN VACUUM CLEANER

[75] Inventor: Seung M. Baeg, Kyungsangnam-Do, Rep. of Korea

[73] Assignee: Goldstar Co., Ltd., Seoul, Rep. of Korea

[21] Appl. No.: 904,486

[22] Filed: Jun. 25, 1992

[30] Foreign Application Priority Data

Jun. 25, 1991 [KR] Rep. of Korea ............... 10590/1991

[51] Int. Cl.⁵ ............................................. H02P 5/17
[52] U.S. Cl. ................................. 388/811; 15/319; 15/339
[58] Field of Search .............. 388/811, 804, 809–815, 388/907.5; 15/319, 339

[56] References Cited

U.S. PATENT DOCUMENTS

| | | | |
|---|---|---|---|
| 4,370,690 | 1/1983 | Baker | 318/463 |
| 4,402,607 | 7/1983 | McVay et al. | 356/338 X |
| 4,601,082 | 7/1986 | Kurz | 15/319 |
| 4,607,228 | 8/1986 | Reif | 324/454 |
| 4,680,827 | 7/1987 | Hummel | 15/319 |
| 4,767,213 | 8/1988 | Hummel | 15/339 X |
| 4,937,912 | 7/1990 | Kurz | 15/339 |
| 5,075,607 | 12/1991 | Koharagi | 318/432 X |
| 5,136,750 | 8/1992 | Takashima et al. | 15/319 |
| 5,144,715 | 9/1992 | Matsuyo et al. | 15/319 |
| 5,152,028 | 10/1992 | Hirano | 15/319 |
| 5,163,202 | 11/1992 | Kawakami et al. | 15/319 |
| 5,182,833 | 2/1993 | Yamaguchi et al. | 15/319 |

FOREIGN PATENT DOCUMENTS 9017542 12/1990 Rep. of Korea.

Primary Examiner—William M. Shoop, Jr.
Assistant Examiner—David Martin

[57] ABSTRACT

The speed of the suction motor in a vacuum cleaner can automatically be controlled according to the size and amount of the sucked dust on floors, carpets and the like to be cleaned. The amount of dust being sucked is detected, pulse signals corresponding to the detected amount of the sucked dust are output, a duty cycle of the output pulses is calculated for a predetermined period of time, the amount of dust according to the calculated duty cycle is calculated and a firing angle of the suction motor is controlled based on the calculated values of the amount of dust. Power consumption and noise in the vacuum cleaner are reduced and the user can exactly plan his or her cleaning schedule in consideration of the amount of dust. Further, the current speed of the suction motor is displayed on the display, thereby enabling the user to exactly recognize the current amount of dust.

29 Claims, 4 Drawing Sheets

APPARATUS AND METHOD FOR CONTROLLING SPEED OF SUCTION MOTOR IN VACUUM CLEANER

BACKGROUND OF THE INVENTION

1. Field of the Invention

The present invention relates in general to the control of the dust suction force of a vacuum cleaner, and more particularly to an apparatus and method for controlling the speed of a suction motor in a vacuum cleaner, wherein the speed of the suction motor, corresponding to the dust suction force of the vacuum cleaner, can automatically be controlled according to amount of dust on floors, carpets and the like to be cleaned.

2. Description of the Prior Art

Referring to FIG. 1, there is shown, in block form, an example of conventional apparatus for controlling the speed of a suction motor in a vacuum cleaner. As Shown in FIG. 1, the conventional apparatus comprises an infrared transmitter 3 disposed at one side in a suction port 1 (see FIG. 3) of the vacuum cleaner for transmitting infrared rays, an infrared receiver 4 disposed at the opposite side in the suction port 1 for receiving the infrared rays from the infrared transmitter 3 and ouputting electrical signals corresponding to amount of the sucked dust in accordance with amount of the received infrared rays, a differentiator 5 for differentiating output signals from the infrared receiver 4, a comparator 6 for comparing the output signal from the differentiator 5 with a reference voltage and reshaping the compared signal into a rectangular pulse, and a control circuit 7 for counting up the number of the output pulses from the comparator 6 during a sampling time and controlling the speed of a suction motor 8 (see FIG. 2) in accordance with the total number of the pulses.

Referring to FIG. 2, there is shown a detailed block diagram of the control circuit 7 in the apparatus of FIG. 1. As shown in this drawing, the control circuit 7 includes a pulse number counter 71 for counting up the number of the output pulses from the comparator 6 during the sampling time, a predetermined time controller 72 for controlling the sampling time during which the pulse number counter 71 counts up the number of the output pulses from the comparator 6, a speed rate calculator 73 for calculating a speed rate based on the total number of the pulses, a firing angle controller 74 for controlling a firing angle in accordance with the calculated speed rate from the speed rate calculator 73 to control the rotational speed of the suction motor 8, and a speed display controller 75 for controlling a display 9 which displays the current speed, in accordance with the calculated speed rate from the speed rate calculator 73.

The operation of the conventional apparatus for controlling the speed of the suction motor in the vacuum cleaner, constructed as mentioned above, will hereinafter be described.

As mentioned previously, the infrared transmitter 3 and the infrared receiver 4 cooperate to detect the amount of the sucked dust. As shown in FIG. 3, the infrared transmitter 3 and the infrared receiver 4 are disposed oppositely to each other at both sides of the suction port 1 of the vacuum cleaner. In this construction, the amount of infrared rays which the infrared receiver 4 receives from the infrared transmitter 3 is inversely proportional to the amount of the dust 2 being sucked through the suction port 1. In other words, the more the amount of dust being sucked, the less infrared light received by the light receiving transistor in the infrared receiver 4. Consequently, the potential at the collector of the light receiving transistor rises. In other words, the infrared rays from the infrared transmitter 3 are blocked by foreign substances such as the sucked dust 2 wastepapers, or the like, causing the light receiving transistor in the infrared receiver 4 to be turned off. The turning-off of the light receiving transistor results in an output of a high level voltage signal therefrom.

The output voltages produced dependently on the amount of the sucked dust in the infrared receiver 4 are differentiated by the differentiator 5 and then applied to the comparator 6 for comparison with a predetermined reference voltage. As a result of the comparison, outputted from the comparator 6 are rectangular pulse signals in which high level pulse intervals and low level pulse intervals can be definitely distinguished, as shown in FIG. 4. The low level pulse intervals of the pulse signals indicate that dust is not being sucked, while the high level pulse indicate that dust is being sucked. It can be immediately found that the more dust being sucked is, the more frequent high level pulses are generated.

On the other hand, the control circuit 7 counts the number of the output pulses from the comparator 6 during the predetermined period of time and controls the rotational speed of the suction motor 8 in accordance with the total number of the pulses counted during the predetermined period of time. That is, in the control circuit 7, the pulse counter 71 is enabled during the sampling time under the control of the predetermined time controller 72. As a result, the pulse counter 71 counts up the number of the pulses which are fed from the comparator 6 during the predetermined period of time. In the speed control value calculator 73, the speed control value is calculated based on the total number of pulses counted by the pulse counter 71. The speed control value then calculator applied to the firing angle controller 74. As a result, the firing angle controller 74 controls the firing angle of the suction motor 8, in accordance with the speed control value calculated from the speed control value calculator 73, to adjust the rotational speed of the suction motor 8 and the dust suction force of the vacuum cleaner. At this time, the speed display controller 75 controls the display 9 to indicate the speed or the amount of the dust being sucked in accordance with the calculated speed control value from the speed control value calculator 73. Upon checking the speed of the suction motor, the user may figure out the amount of the dust being sucked since the speed of the suction motor corresponds to the amount of the dust being sucked.

However, the above-mentioned conventional apparatus fails to take into account the fact that the longer the high level pulse time is, the more the amount of dust is being sucked. As a result, the conventional apparatus has a disadvantage, in that it cannot properly cope with the size and amount of the sucked dust, since it merely counts the pulses detected during the predetermined period of time and controls the speed of the suction motor, regardless of the pulse time or how the high level pulses are.

Recently, there have been proposed apparatuses for controlling the rotation speed of the motor in consideration of the size of the sucked dust.

A representative example of such an apparatus is shown in Korean Patent Laid-open Publication No.

90-17542 (Korean Patent Application No. 90-6698, filed May 11, 1990). This representative apparatus comprises dust detecting means for transforming output signals from a dust detecting sensor into pulse signals and control means for counting the number of output pulses from the dust detecting means during a predetermined period of time. It then applies a pulse width correction to the counted total number of pulses and controls the rotational speed of the suction motor in accordance with the compensated total number of pulses.

For example, assume that n is the counted number of the pulses, at least one of which has a wide pulse width. In this case, the correction of the number n pulses is obtained by multiplying the number n by a pulse width correction coefficient k (n×k). Therefore, the speed of the suction motor in the vacuum cleaner is controlled according to the compensated number of the pulses.

Such a conventional apparatus suggests a compensation with respect to a pulse width, however, it requires extra steps and components for comparing each pulse width with a reference pulse with respect to their pulse width, and selecting out a desirable pulse width compensation coefficient while taking into account how many wide pulses are among the total high level pulse and how wide they are.

SUMMARY OF THE INVENTION

The present invention has been made in view of the above problems, and it is an object of the present invention to provide an apparatus and method for controlling the speed of a suction motor in a vacuum cleaner, which can properly cope with size and amount of dust on floors, carpets and the like to be cleaned.

In accordance with one aspect of the present invention, the above object can be accomplished by providing an apparatus for controlling the speed of a suction motor in a vacuum cleaner. The apparatus comprises: dust detecting means, disposed in a suction port of the vacuum cleaner, for detecting an amount of dust being sucked through said suction port and outputting electrical signals corresponding to the detected amount of the sucked dust. The apparatus also comprises waveform shaping means for transforming output signals from the dust detecting means into rectangular pulse signals in proportion to the amount of sucked dust. The apparatus further comprises speed control means for calculating a duty cycle of the pulses outputted from signal shaping means during the sampling time, calculating a speed rate of the suction motor according to the duty cycle, and controlling the speed of the suction motor in accordance with the speed rate.

In accordance with another aspect of the present invention, the above object can be accomplished by a method of controlling speed of a suction motor in a vacuum cleaner. The method comprises a dust detecting step of detecting an amount of dust being sucked and outputting pulse signals corresponding to the detected amount of the sucked dust. The method also comprises a sampling time counting step of counting a predetermined period of time and a duty cycle calculating step of calculating a duty cycle of the output pulse, which are counted during the sampling time counting step. The method further comprises a suction motor speed controlling step of controlling the rotational speed of the suction motor according to the duty cycle calculated at the duty cycle calculating steps, and a step of performing the above steps repeatedly in the operation of the vacuum cleaner.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE INVENTION

Figure 5:
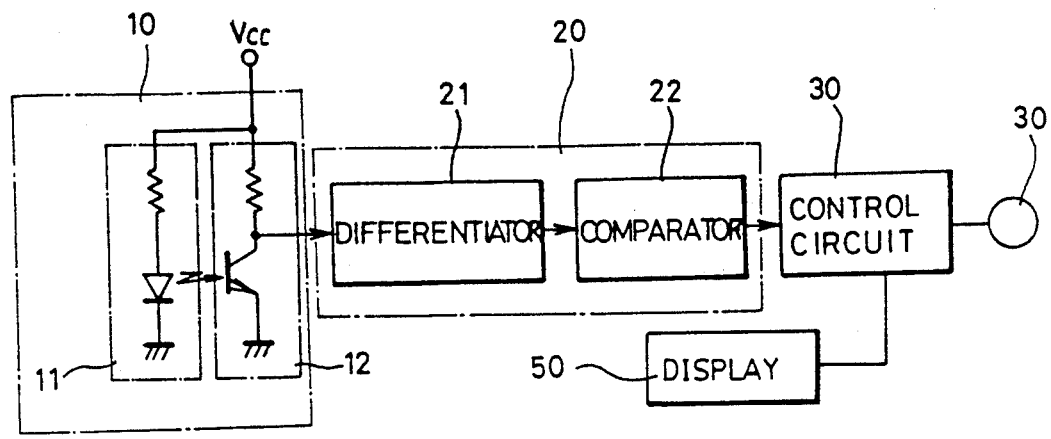
FIG. 5 is a block diagram of an apparatus for controlling the speed of a suction motor in a vacuum cleaner in accordance with the present invention.

Referring to FIG. 5, there is shown a block diagram of an apparatus for controlling the speed of a suction motor in a vacuum cleaner in accordance with the present invention. As shown in this drawing, the apparatus of the present invention comprises a dust detecting sensor 10 for detecting the amount of dust being sucked through a suction port (not shown) of the vacuum cleaner and outputting electrical signals corresponding to the detected amount of the sucked dust; a waveform shaping circuit 20 for transforming output signals from the dust detecting sensor 10 into rectangular pulses corresponding to the amount of dust; a control circuit 30 calculating a duty cycle of the pulses outputted from the shaping means during the sampling time, for calculating a desired speed rate of the suction motor according to the duty cycle, and for controlling; the speed of the suction motor and a display 50, displaying in accordance with the speed rate.

The dust detecting sensor 10 includes an infrared transmitter 11 (disposed at one side in the suction port of the vacuum cleaner for transmitting infrared rays) and an infrared receiver 12 (disposed at the opposite side in the suction port for receiving the infrared rays from the infrared transmitter 11). The infrared receiver 12 outputs electrical signals, which are proportional to the amount of the sucked dust, in accordance with the amount of the received. The infrared rays vary with the amount of the dust being sucked between the infrared transmitter and receiver 11 and 12.

Also, the waveform shaping circuit 20 comprises a differentiator 21 and a comparator 22. The differentiator differentiates output signals from the infrared receiver 12. The comparator 22 compares output signals from the differentiator 21 with a predetermined reference value and outputs the waveform shaped pulse signals after the comparison.

Figure 6:
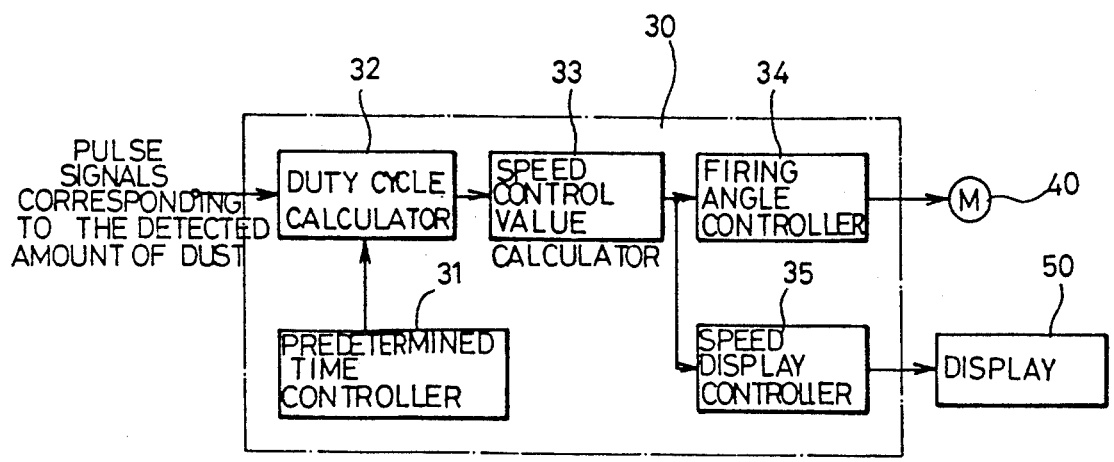
FIG. 6 is a detailed block diagram of a speed control circuit in the apparatus of FIG. 5.

Referring to FIG. 6, there is shown a detailed block diagram of the speed control circuit 30 in the apparatus of FIG. 5. As shown in FIG. 6, the speed control circuit 30 includes a sampling time controller 31 for controlling the sampling time, or a reference period of time for detection of the amount of dust. The speed control circuit 30 also includes a duty cycle calculator 32 for calculating the duty cycle of the pulses which are outputted from the comparator 22 during the sampling time under the control of the sampling time controller 31, the duty cycle (a ratio of pulse widths with respect to the sampling time) being indicative of the substantial amount of dust. The speed control circuit 30 includes, a speed rate calculator 33 for calculating the speed control value based on the duty cycle value from the duty cycle calculator 32. The speed control circuit 30 further includes a firing angle controller 34 for controlling a firing angle of the suction motor 40 in accordance with the speed control value from the speed control value calculator 33 to control the rotational speed of the suction motor 40. Also, the speed control circuit includes and a speed display controller 35 for controlling the speed display of the display 50 in accordance with the calculated speed control value from the speed rate calculator 33.

Now, the operation of the apparatus for controlling the speed of the suction motor in the vacuum cleaner, constructed in accordance with the present invention as mentioned above, will be described in detail.

Figure 1:
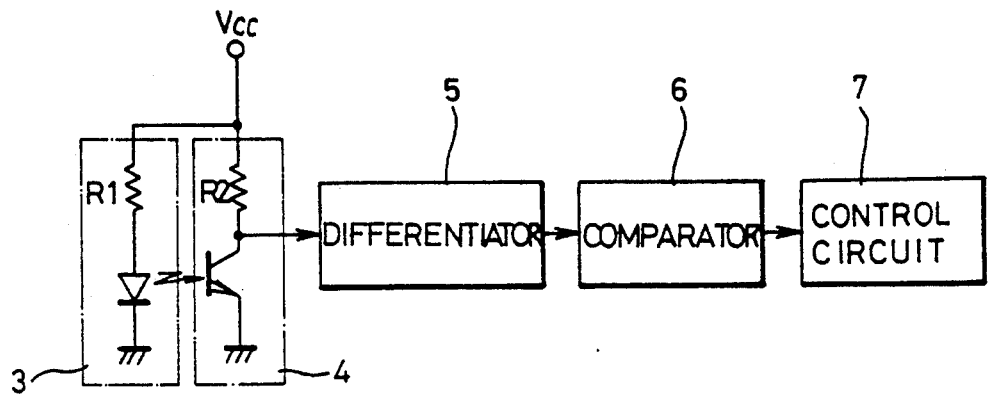
FIG. 1 is a block diagram of conventional apparatus for controlling speed of a suction motor in a vacuum cleaner.
Figure 2:
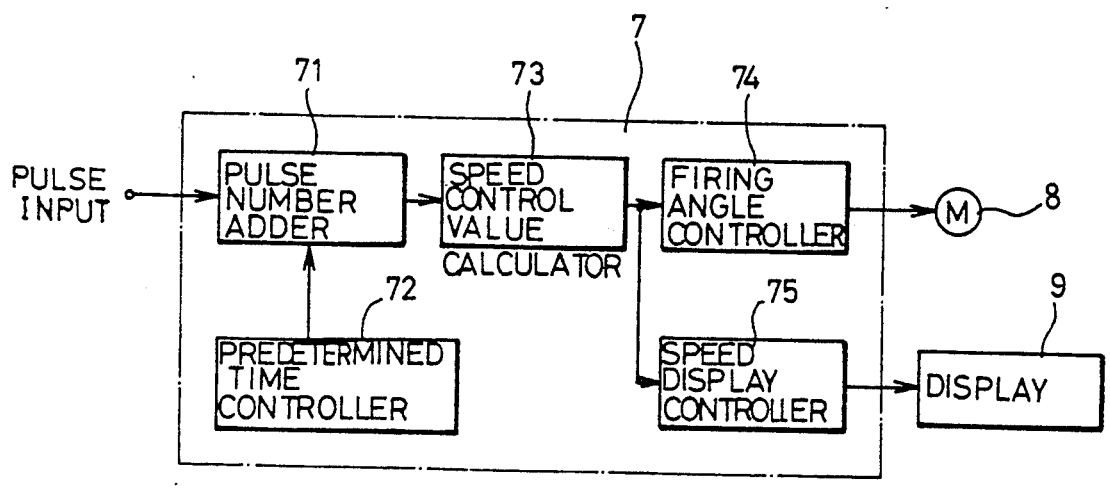
FIG. 2 is a detailed block diagram of a control circuit of the apparatus of FIG. 1.
Figure 3:
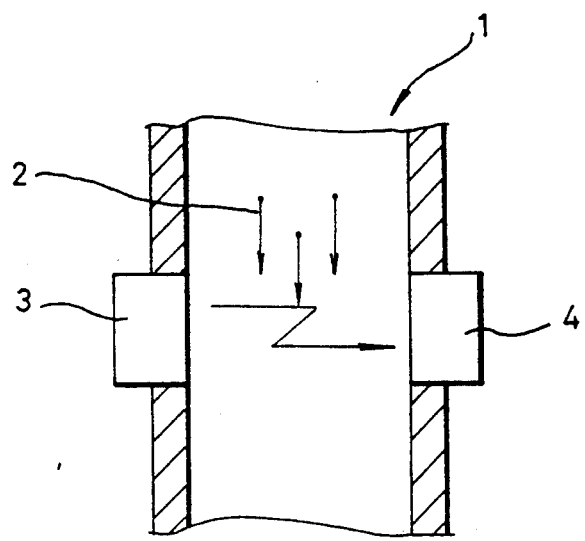
FIG. 3 is a schematic diagram of a suction port of the vacuum cleaner, illustrating portions at which an infrared transmitter and an infrared receiver in the apparatus of FIG. 1, are disposed in the suction port.
Figure 4:
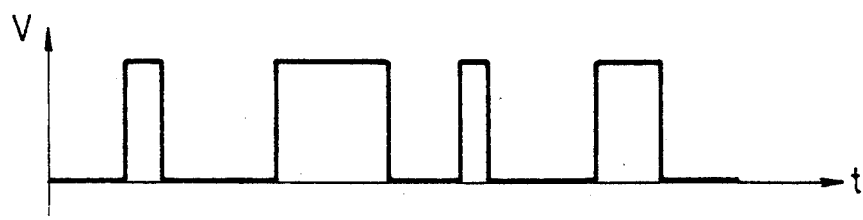
FIG. 4 is a waveform diagram of output signals from a comparator in the apparatus of FIG. 1.

As mentioned previously, the infrared transmitter 11 and the infrared receiver 12, in the dust detecting sensor 10, cooperate to detect the amount of the sucked dust. As described previously with reference to FIG. 3, the infrared transmitter 11 (designated 3 in FIG. 3) and the infrared receiver 12 (designated 4 in FIG. 3) are disposed oppositely to each other in the suction port 1 of the vacuum cleaner. In this construction, the amount of infrared rays which the infrared receiver 12 receives from the infrared transmitter 11 is in inverse by proportional to the amount of the dust 2 being sucked through the suction port 1. In other words, the infrared rays from the infrared transmitter 11 are blocked by the foreign substances, such as the sucked dust 2, wastepapers, or the like, causing the light receiving transistor in the infrared receiver 12 to be turned off. The turning-off of the light receiving transistor results in output of a high level voltage signal therefrom.

As a result, the more dust 2 being sucked, the longer the pulse time of the high level pulses (or the wider the pulse width of the high level pulses), and the more frequent the high level pulses are generated.

Figure 7:
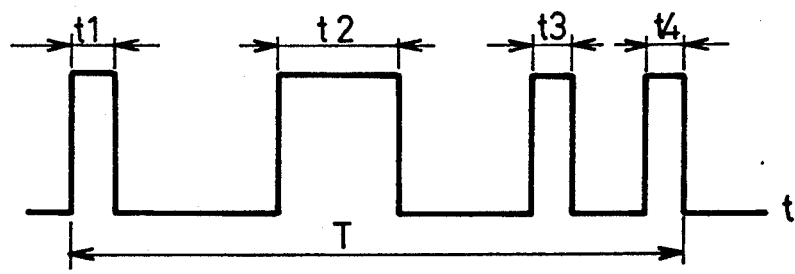
FIG. 7 is the waveform diagram of output signals from a comparator in the apparatus of FIG. 5, illustrating intervals for calculation of a duty cycle according to the present invention.

The output voltage produced depends on the detected amount of the dust being sucked by the infrared receiver 12. The output voltage is differentiated by the differentiator 21 in the waveform shaping circuit 20 and then applied to the comparator 22 for comparison with a predetermined reference voltage. As a result of the comparison, comparator 22 outputs waveform shaped pulse signals in which high level pulses and low level pulse intervals can be definitely distinguished from each other as shown in FIG. 7. The low level pulse can be interpreted that no dust is being sucked, while the high level pulses can be interpreted that dust is sucked. The more dust being sucked, the longer the pulse time of the high level pulses (or the wider the pulse width of the high level pulses), and the more frequent the high level pulses are generated.

Then, the speed control circuit 30 calculates the duty cycle of the pulses outputted from the comparator 22 during the sampling time, calculates a speed rate of the suction motor according to the duty cycle, and controls the speed of the suction motor 40 in accordance with the calculated speed control value.

Namely, in the speed control circuit 30, the duty cycle calculator 32 calculates the duty cycle of the pulses which are outputted from the comparator 22 in the waveform shaping circuit 20 during the sampling time under the control of the predetermined time controller 31. The speed control value is then calculated based on the duty cycle in the speed control value calculator 33. The speed control value is applied to the firing angle controller 34. The firing angle controller 34 controls the rotational speed of the suction motor 40 in accordance with the newly calculated speed control value from the speed control value calculator 33.

As shown in FIG. 7, upon receiving the shaped pulses from the comparator 22 in the waveform shaping circuit 20 as shown in FIG. 7, the duty cycle calculator 32 calculates the duty cycle of the pulses received during the sampling time T under the control of the sampling time controller 31. The duty cycle calculates the ratio of the high level pulse holding intervals (pulse widths) to the period of time T. The duty cycle can be expressed as follows:

$$\text{Duty cycle} = (t1 + t2 + t3 + t4)/T$$

From the above equation, it can be seen that the duty cycle is indicative of information regarding the amount and the size of dust being sucked through the suction port of the vacuum cleaner during the sampling time T.

Then in the speed control value calculator 33, the rotational speed control value is calculated based on the duty cycle from the duty cycle calculator 32 (for the suction motor 40). Namely, the speed control value calculator 33 calculates the rotation speed control value for the suction motor 40 such that the number of rotations of the suction motor 40 corresponds to the calculated duty cycle value, and maintains the calculated rotation speed control value for a certain time. After maintenance of the rotational speed control value for a certain time, the above-mentioned procedures are repeated to obtain a new duty cycle and speed control value as an amount of dust being sucked varies. Once a new speed control value and a new duty cycle are obtained, the rotational speed of the suction motor gets faster in the case where the amount of dust being sucked has increased, while it gets slower in the case where the amount of dust being sucked has decreased.

The firing angle controller 34 controls the firing angle of the suction motor 40 in accordance with the newly calculated speed control value from the speed control value calculator 33. The rotation speed of the suction motor 40 is controlled by steps by varying the firing angle (phase angle) thereof.

In this manner, calculating the duty cycle for a certain time makes it possible to detect the amount and size of dust for the predetermined period of time T. Further, calculating a new duty cycle every sampling time leads to a desirable speed control of a suction motor of a vacuum cleaner corresponding to an increase/decrease in an amount of dust being sucked.

On the other hand, in calculating the duty cycle in the duty cycle calculator 32, the duty cycle in FIG. 7 may be obtained by the following equation.

$$\text{Duty cycle} = t1/T + t2/T + t3/T + t4/T$$

Also, the ducy cycle calculator 32 may obtain the sum, t1+t2+t3+t4 (the sum of the high level pulse holding intervals in FIG. 7), of the high level pulse holding intervals for the sampling time, (or the predetermined period of time T) to get the rotation speed control value for the suction motor 40.

The speed control circuit 30 may comprise a microprocessor and associated peripheral equipments, included in a control system of the vacuum cleaner. The operation of the speed control circuit 30 will hereinafter be described in detail with reference to FIG. 8.

Figure 8:
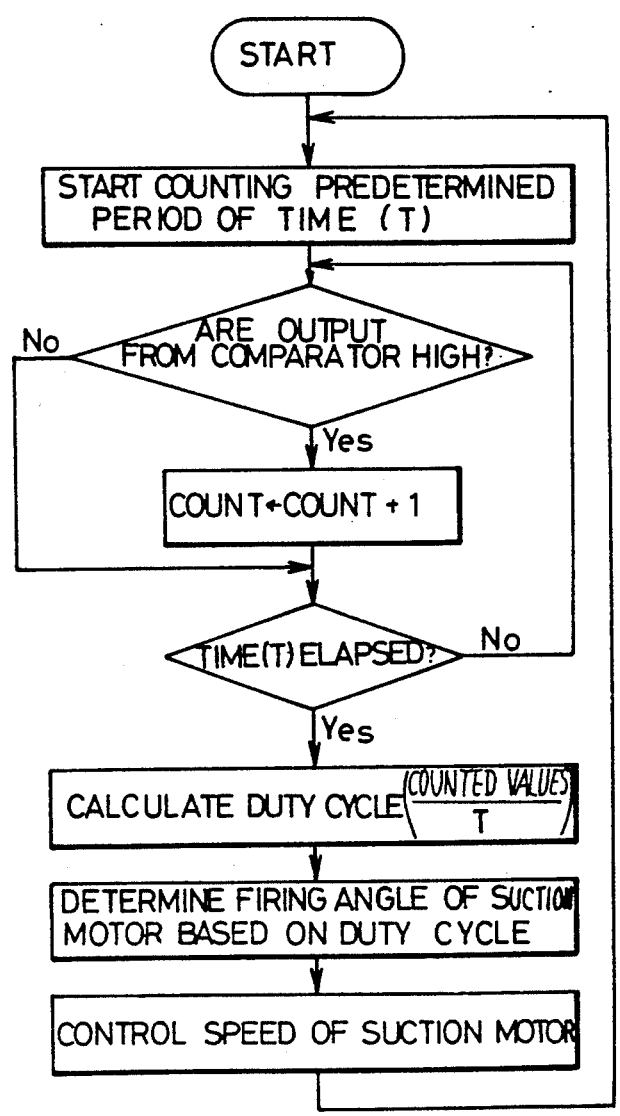
FIG. 8 is a flowchart illustrating a method of controlling the speed of a suction motor in a vacuum cleaner in accordance with the present invention.

Referring to FIG. 8, there is shown a flowchart illustrating a method of controlling the speed of a suction motor in a vacuum cleaner in accordance with the present invention. As shown in FIG. 8, the method of controlling the speed of the suction motor in the vacuum cleaner utilizing the speed control circuit 30 in accordance with the present invention comprises a dust detecting step of, upon operation of the vacuum cleaner, detecting the amount of the sucked dust and outputting the pulse signals corresponding to the detected amount of the sucked dust. The method includes a sampling time counting step of counting the predetermined period of time T and a duty cycle calculating step of calculating the duty cycle of the output pulses for the sampling time which is counted at the sampling time counting step. The method further includes a suction motor speed controlling step of controlling the rotation speed of the suction motor based on the duty cycle calculated at the duty cycle calculating step. The method may also include a step of performing the above steps repeatedly in operation of the vacuum cleaner.

The duty cycle calculating step includes a high level pulse time counting step of, upon counting the predetermined period of time T at the predetermined time counting step, checking whether the output pulses at the dust detecting step are high to count the corresponding high level pulse time. The duty cycle calculating step further includes a step of checking, during the counting of the high level pulse time, whether the counted value at the predetermined time counting step is in accord with the pulse time T, and stopping the counting of the high level pulse time if the counted value at the predetermined time counting step is in accord with the predetermined period of time T. The duty cycle calculating step further includes a step of calculating the duty cycle by dividing the counted values of the high level pulse time by the predetermined period of time T.

Also, the suction motor speed controlling step includes a firing angle determining step of determining the firing angle of a drive current to the suction motor based on the duty cycle calculated at the duty cycle calculating step. The suction motor speed controlling step also includes a speed controlling step of controlling the rotation speed of the suction motor by controlling the firing angle of the drive current thereto based on the firing angle determined at the firing angle determining step.

In accordance with the above-mentioned flowchart, the operation of the vacuum cleaner is started with the minimum suction force at the initial state and, at the same time, the counting of the predetermined period of time T is started. At this time, it is checked whether the pulses which are outputted from the comparator 22 in the waveform shaping circuit 20 are high. If it is checked that the output pulses from the comparator 22 are high, the corresponding high level pulse time is counted. On the contrary, if low, no counting of the high level pulse time is performed because no dust is sucked.

It is then checked whether it is the end of the sampling time. If the counted value at the sampling time counting step is less than the sampling time T, counting the high level pulse holding intervals continues to be performed in the above manner.

On the other hand, if the counted value at the predetermined time counting step is in accord with the predetermined period of time T, the duty cycle is calculated based on the time intervals (the counted values of the high level pulse holding intervals) during which the dust was sucked for the predetermined period of time T follows:

$$\text{Duty cycle} = (t1+t2+t3+t4)/T$$

Then, the speed control value for the suction motor 40 is calculated based on the calculated duty cycle. The firing angle of the drive current to the suction motor 40 is thus determined according to the calculated speed control value. As a result, the suction motor 40 is driven at a new speed based on the determined firing angle.

The above operation is repeatedly performed at a period of the predetermined period of time T, thereby enabling the automatic variation in the speed of the suction motor 40 according to the amount of dust.

Also, the speed control value calculator 33 feeds the speed control value to the speed display controller 35, which controls the display 50 based on the speed control value. The speed of the suction motor 40 is displayed in a level bar or digital numerals. This allows the user to recognize the current speed of the suction motor 40 and the current amount of dust being sucked.

In accordance with another aspect of the present invention, the duty cycle calculating step may include a high level pulse holding interval counting step of, (during the sampling time counting step) checking whether an output pulse at the dust detecting step is high and counting the corresponding high level pulse time tn if the output pulse at the dust detecting step is high. The duty cycle calculating step may also include, a step of checking during the counting of the high level pulse time whether the current counted position of the high level pulse is a falling edge thereof or not, stopping counting the high level pulse holding interval tn if the current counted position of the high level pulse is the falling edge thereof, dividing the counted value tn by the sampling time, or the predetermined period of time T, i.e., (tn/T), cumulating the resulting value (tn/T), i.e., (SUM=SUM+tn/T) and clearing a counter for counting the high level pulse time. The duty cycle calculating step may include, a step of checking whether the counted value at the sampling time counting step is in accord with the predetermined period of time T after the cumulating step, or if the output pulse at the dust detecting step is not high, or if the current counted position of the high level pulse is not the falling edge thereof and returning to the high level pulse time counting step if the counted value at the sampling time counting step is less than the predetermined period of the time T. The duty cycle calculating step may include a step of stopping the counting of the high level pulse holding interval tn if the counted value at the predetermined time counting step is in accord with the predetermined period of time T, dividing the counted value tn by the sampling time, or the predetermined period of time T, i.e., (tn/T), cumulating the resulting value (tn/T), i.e., (SUM=SUM+tn/T), clearing the counter for counting the high level pulse holding interval and then proceeding to the suction motor speed controlling step.

Further in the duty cycle calculating step, the sum of the high level pulse holding intervals for the sampling time, or the predetermined period of time T may be obtained as information regarding the amount of dust, instead of the duty cycle. An the suction motor speed controlling step, the rotation speed of the suction motor may be controlled according to the information regarding the amount of dust based on the obtained sum of the high level pulse holding intervals.

As hereinbefore described, according to the present invention, there is provided an apparatus and method for controlling the speed of a suction motor in a vacuum cleaner, wherein the speed of the suction motor can automatically be controlled according to the size and amount of the sucked dust on floors, carpets and the like to be cleaned, so that power consumption and noise in the vacuum cleaner can be reduced and the user can exactly plan his or her cleaning schedule in consideration of the amount of dust.

Although the preferred embodiments of the present invention have been disclosed for illustrative purpose, those skilled in the art will appreciate that various modifications, additions and substitutions are possible, without departing from the scope and spirit of the invention as disclosed in the accompanying claims.

What is claimed is:

1. An apparatus for controlling speed of a suction motor in a vacuum cleaner, comprising:
   dust detecting means, disposed in a suction port of the vacuum cleaner, for detecting an amount of dust being sucked through said suction port and for outputting electrical output signals corresponding to the detected amount of the dust being sucked;
   waveform shaping means for transforming the output signals from said dust detecting means into rectangular pulses proportional to the amount of dust; and
   speed control means for calculating a duty cycle of the rectangular pulses outputted from the waveform shaping means during a sampling time, for calculating a desired speed value of the suction motor as a constant multiplied by the duty cycle, and for controlling the speed of the suction motor in accordance with the desired speed value.

2. The apparatus for controlling speed of a suction motor in a vacuum cleaner, as set forth in claim 1, wherein said waveform shaping means includes:
   a differentiator for differentiating the output signals from said dust detecting means and for outputting differentiated signals; and
   a comparator for comparing the differentiated signals output from said differentiator with a predetermined reference value and outputting the rectangular pulses as a result of the comparison.

3. The apparatus for controlling speed of a suction motor in a vacuum cleaner, as set forth in claim 1, wherein said speed control means includes:
   a sampling time controller for controlling the sampling time during which the duty cycle of the rectangular pluses is calculated;
   a duty cycle calculator for calculating the duty cycle of the rectangular pulses which are outputted form said waveform shaping means during the sampling time under the control of said sampling time controller, the duty cycle being indicative of the amount of dust being sucked;
   a desired speed value calculator for calculating the desired speed value based on the calculated duty cycle from said duty cycle calculator; and
   a firing angle controller for controlling a firing angle of a drive current to the suction motor in accordance with the calculated desired speed value from said desired speed value calculator to control the speed of the suction motor.

4. The apparatus for controlling speed of a suction motor in a vacuum cleaner, as set forth in claim 3, wherein said duty cycle calculator calculates the duty cycle by counting the time at which the rectangular pulses are at a high level during the sampling time producing a count, and dividing the count by the sampling time.

5. The apparatus for controlling speed of a suction motor in a vacuum cleaner, as set forth in claim 1, further comprising:
   display means for displaying the speed of the suction motor and the amount of dust.

6. The apparatus for controlling speed of a suction motor in a vacuum cleaner, as set forth in claim 5, wherein said speed control means further includes a display controller for controlling the speed and the amount of dust displayed in said display means in accordance with the calculated desired speed value.

7. A method of controlling speed of a suction motor in a vacuum cleaner, comprising:
   a dust detecting step of detecting an amount of dust being sucked and outputting pulses corresponding to the detected amount of the dust being sucked;
   a sampling time counting step of counting a predetermined period of time;
   a duty cycle calculating step of calculating a duty cycle of the output pulses during the sampling time; and
   a suction motor speed controlling step of controlling the rotation speed of the suction motor as a function of only one variable, said variable being the duty cycle calculated at said duty cycle calculating step.

8. The method of controlling speed of a suction motor in a vacuum cleaner, as set forth in claim 7, wherein said duty cycle calculating step includes:
   a high level pulse time counting step of determining whether the output pulses at said dust detecting step are high and counting the corresponding high level holding intervals of the output pulses if the output pulses at said dust detecting step are high, producing counted values;
   a step of determining whether the predetermined period of time has been counted at said predetermined time counting step and stopping the counting of the high level holding intervals of the output pulses if the predetermined period of time has been counted; and
   a step of determining the duty cycle by dividing the counted values of the high level holding intervals of the output pulses by the predetermined period of time.

9. The method of controlling speed of a suction motor in a vacuum cleaner, as set forth in claim 7, wherein said duty cycle calculating step includes:

a high level holding interval counting step of determining whether an output pulse at said dust detecting step is high and counting the corresponding high level holding interval of the output pulse if the output pulse at said dust detecting step is high;

a cumulating step of determining during the counting of the high level holding interval of the output pulse whether the current level of the output pulse is a falling edge, stopping the counting of the high level holding interval of the output pulse if the level of the output pulse is a falling edge, dividing the counted value of the high level holding interval by the predetermined period of time to create a resulting value, cumulating the resulting value for each output pulse within the predetermined period of time, and resetting the count of the high level holding interval;

a step of determining whether the predetermined period of time has been counted at said predetermined time counting step and if the output pulse at said dust detecting step is not high or a falling edge returning to said high level holding interval of the output pulse counting step if the predetermined period of time counted at said predetermined time counting step is less than the predetermined period of time; and a step of stopping the counting of the high level holding interval of the output pulse if the predetermined period of time counted at said predetermined time counting step is equal to or greater than the predetermined period of time, dividing the counted value of the high level holding interval by the predetermined period of time to create a resulting value, cumulating the resulting value, resetting the count of the high level holding interval and then proceeding to said suction motor speed controlling step.

10. The method of controlling speed of a suction motor in a vacuum cleaner, as set forth in claim 7, wherein said suction motor speed controlling step includes:

a firing angle determining step of determining a desired firing angle of a drive current to the suction motor based on the duty cycle calculated at said duty cycle calculating step; and a speed controlling step of controlling the rotation speed of the suction motor based on the desired firing angle determined at said firing angle determining step.

11. A method of controlling speed of a suction motor in a vacuum cleaner, comprising the steps of:

(a) detecting an amount of dust being sucked and outputting pulse signals corresponding to the detected amount of the sucked dust;

(b) calculating a duty cycle of the output pulses at said dust detecting step for a predetermined period of time corresponding to the amount of dust sucked during said predetermined period of time and calculating a desired speed of the suction motor as a function of only one variable, said variable being the duty cycle;

(c) controlling the rotation speed of the suction motor to equal the calculated desired speed; and (d) performing steps (a), (b), and (c) repeatedly in the operation of the vacuum cleaner.

12. A method of controlling speed of a suction motor in a vacuum cleaner, comprising the steps of:

(a) detecting an amount of sucked dust and outputting pulse signals corresponding to the detected amount of the sucked dust;

(b) counting a predetermined period of time;

(c) accumulating high level holding intervals of the interval pulses at said dust detecting step for the predetermined period of time which is counted at said predetermined time counting step;

(d) controlling the rotation speed of the suction motor to equal the product of the accumulated high level holding intervals multiplied by a constant; and (e) a step of performing steps (a), (b), (c), and (d) repeatedly in operation of the vacuum cleaner.

13. A method for controlling the speed of a motor in a vacuum comprising the steps of:

(a) detecting objects to be vacuumed;

(b) creating electrical pulses having two states based upon the detected objects;

(c) calculating a value representing a first length of time the electrical pulses have been in one of said two states during a second continuous length of time; and (d) controlling the speed of said motor as a function of only one variable, said variable being said calculated value.

14. The method of claim 13 wherein step (d) includes controlling the speed of said motor to equal the product of a constant multiplied by said calculated value.

15. The method of claim 14 wherein step (a) includes detecting objects using infrared sensors in a suction part of said vacuum, said infrared sensors having an output signal.

16. The method of claim 15 wherein step (b) includes differentiating the output signal of the infrared sensors, comparing the differentiated output signal with a predetermined value and outputting a first state of the electrical pulse when said differentiated signal is less than said predetermined value and a second state of the electrical pulse when said differentiated signal is greater than said predetermined value.

17. The method of claim 13, wherein step (c) includes running a timer for said second continuous length of time.

18. An apparatus for controlling the speed of a motor in a vacuum comprising:

sensors for sensing objects to be vacuumed;

electrical pulse generating means for generating electrical pulses responsive to said sensors, said electrical pulses having two states;

value calculating means for calculating a value representing a first length of time the electrical pulses have been in one of said two stats during a second continuous length of time;

a controller for controlling the speed of said motor as a function of only one variable, said variable being said calculated value.

19. The apparatus of claim 18 wherein said sensors are infrared sensors.

20. The apparatus of claim 18 wherein said electrical pulse generating means includes a differentiator and a comparator.

21. The apparatus of claim 18 wherein the value calculating means includes a timer.

22. An apparatus for controlling rotation speed of a suction motor in a vacuum cleaner, comprising:

means for detecting dust being sucked through a suction port and generating an electrical signal corresponding to size and an amount of said dust;

waveform shaping means for changing said electrical signal into a pulse signal in a rectangular waveform;

a sampling time controller for controlling a predetermined sampling time;

a duty cycle calculator for calculating a duty cycle for said sampling time by counting a time when said electrical signal is at high level during a predetermined sampling time and dividing a sum of said time by said sampling time;

means for obtaining a desired rotation speed value for said suction motor in response to said duty cycle calculator; and means for controlling said rotation speed of said suction motor in accordance with said desired rotation speed value.

23. The apparatus as claimed in claim 22, wherein said waveform shaping means comprises:
a differentiator for differentiating said electrical signal; and
a comparator for comparing said differentiated electrical signal with a predetermined reference value and outputting said pulse signal in said rectangular waveform.

24. The apparatus as claimed in claim 22, wherein said speed control means comprises a firing angle controller for controlling a firing angle of a drive current being supplied into said suction motor.

25. The apparatus as claimed in claim 22, further comprising means for displaying said rotation speed of said suction motor and said amount of said dust.

26. A method of controlling a rotation speed of a suction motor in a vacuum cleaner, comprising the steps of:
a) detecting dust being sucked through a suction port and generating an electrical signal corresponding to a size and an amount of said dust;
b) changing said electrical signal into a rectangular waveform pulse signal;
c) counting a predetermined sampling time;
d) counting a time when said pulse signal is at high level during said sampling time;
e) calculating a duty cycle for said sampling time when said sampling time has lapsed, by dividing a sum of said time by said sampling time;
(f) obtaining a desired rotation speed value for said suction motor based on said duty cycle calculated; and
g) controlling said rotation speed of said suction motor in accordance with said desired rotation speed value.

27. The method as claimed in claim 26, wherein said counting step d) comprises:
checking whether said sampling time has lapsed;
checking whether said pulse signal is at high level;
counting said time if said sampling time has not lapsed and said pulse signal is at high level; and
stopping said counting if said sampling time has lapsed or if said pulse is at low level.

28. The method as claimed in claim 26, wherein said counting step d) comprises:
checking whether said sampling time has lapsed;
checking whether said pulse signal is at ascending edge or at descending edge;
starting counting said time if said sampling time has not lapsed and said pulse signal is at ascending edge; and
stopping said counting if said sampling time has lapsed or said pulse is at descending edge.

29. The method as claimed in claim 26, wherein said speed controlling step g) comprises:
determining a desired firing angle of a drive current being supplied into said suction motor in accordance with said desired rotation speed value to control said rotation speed of said suction motor; and
controlling said drive current according to said desired firing angle to control said speed of said suction motor.

* * * * *